Figure 1:
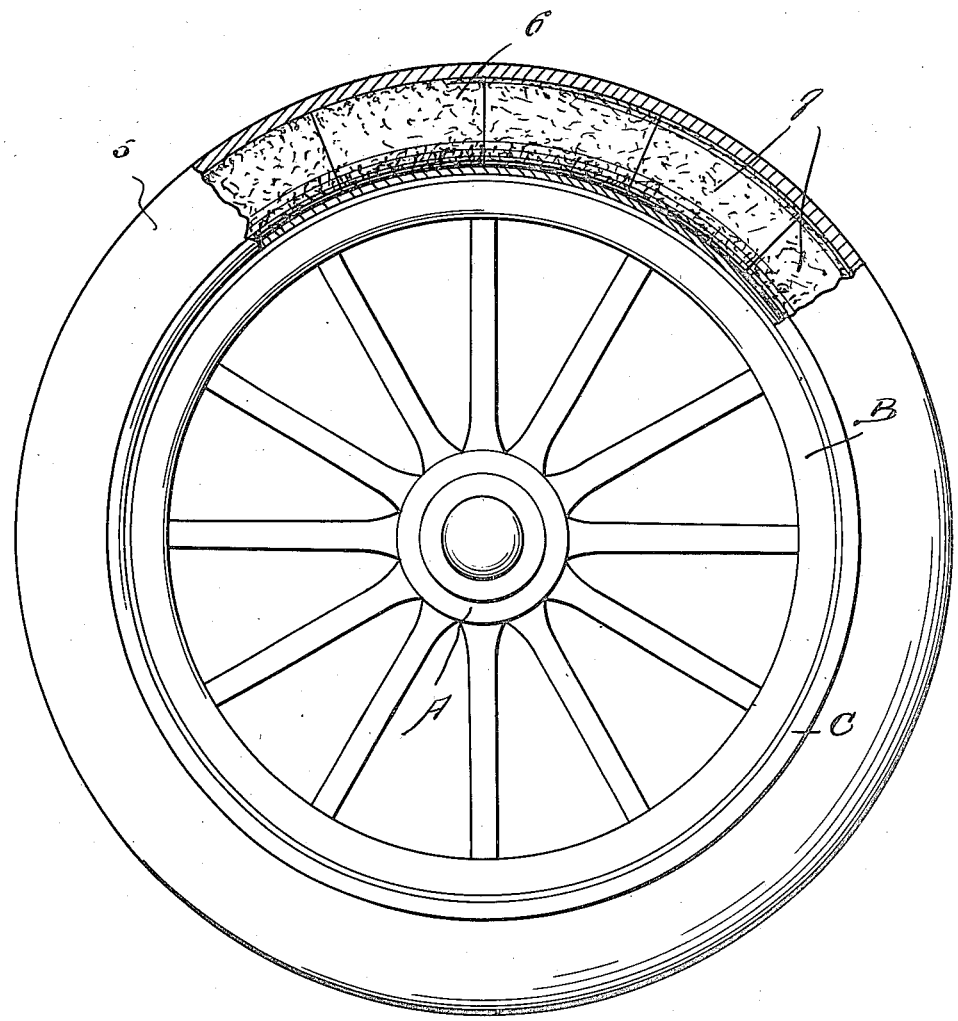

Sept. 18, 1923.  G. M. SCHWENDLER  1,468,035
TIRE FILLER
Filed Jan. 24, 1923  2 Sheets-Sheet 1

Witnesses:

G. M. Schwendler,
Inventor

Sept. 18, 1923.　　　G. M. SCHWENDLER　　　1,468,035
TIRE FILLER
Filed Jan. 24, 1923　　　2 Sheets-Sheet 2

G. M. Schwendler,
Inventor

Witnesses:

Patented Sept. 18, 1923.

1,468,035

UNITED STATES PATENT OFFICE.

GEORGE M. SCHWENDLER, OF APPLETON, WISCONSIN.

TIRE FILLER.

Application filed January 24, 1923. Serial No. 614,561.

*To all whom it may concern:*

Be it known that I, GEORGE M. SCHWENDLER, a citizen of the United States, residing at Appleton, in the county of Outagamie and State of Wisconsin, have invented certain new and useful Improvements in Tire Fillers, of which the following is a specification.

My invention relates to fillers for tires, which will answer all of the purposes of the usual pneumatic tube now employed in this connection, my filler effectively overcoming all blow outs and punctures of the tires for thereby dispensing with the great disadvantages of the pneumatic tubes.

A further object of the invention resides in the provision of such a filler for tires, wherein the same consists of a plurality of previously formed sections, which may be made to fit any size tire shoe, these sections to be placed within the shoe under compression.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 1—is an elevational view of a tire being shown as mounted upon a wheel, a portion of the same being shown in cross section, and more clearly disclosing my improved filler tire.

Figure 2:
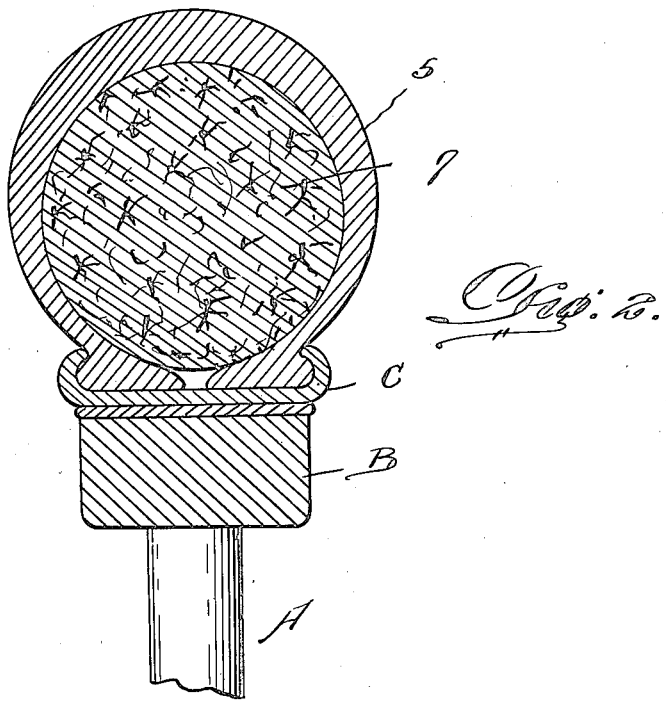
Figure 3:
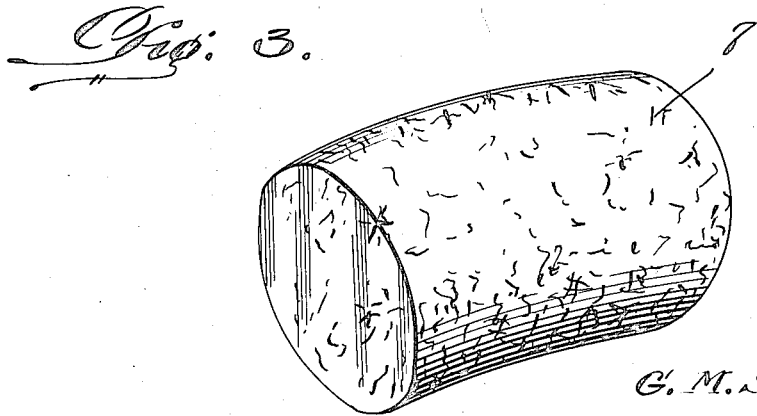

Figure 2—is a cross sectional view of the tire, and a portion of the wheel for more clearly disclosing the exact position of the filler sections within the tire and Figure 3—is a perspective view of one of the filler sections per se.

With particular reference to the drawings, there is shown the vehicle wheel A having the usual felly B thereon, which receives and holds in any manner desirable, the usual demountable metallic rim C. The rim C is of course adapted for receiving the usual tire casing 5, within which there is placed under compression, my filler designated in general by the numeral 6.

It is of course to be understood that this filler 6 is inserted within the tire 5 previous to the mounting of the same upon the rim C. The filler 6 constitutes the provision of a number of previously formed sections 7. Each of these sections 7 are circular in cross section, and are slightly arched as shown, to conform to the configuration of the rim C. The sections 7 of my filler are manufactured from a composition cork or the like, and are highly compressed into the form as shown, the ends thereof, being cut upon a bevel so as to closely contact with each adjacent section 7 as clearly shown in Figure 1.

In view of the above description, it is believed by me that the advantages and operation of my invention will be readily appreciated by those skilled in the art, and while I have herein shown and described the preferred embodiment of the present invention, it is nevertheless to be understood that minor changes may be made therein, without departing from the spirit and scope of the invention as claimed.

What I claim as new is:—

A tire filler of the class described including an annular body of compressed cork having a circular and uniform cross-section throughout, and composed of a series of similar arcuate sections arranged in end to end contiguous relation.

In testimony whereof I affix my signature.

GEORGE M. SCHWENDLER.